United States Patent
Panahpour Tehrani et al.

(10) Patent No.: US 8,164,633 B2
(45) Date of Patent: Apr. 24, 2012

(54) CALIBRATION APPARATUS AND METHOD FOR IMAGING DEVICES AND COMPUTER PROGRAM

(75) Inventors: Mehrdad Panahpour Tehrani, Saitama (JP); Akio Ishikawa, Saitama (JP); Shigeyuki Sakazawa, Saitama (JP)

(73) Assignee: KDDI Corporation, Tokyo (JP)

( * ) Notice: Subject to any disclaimer, the term of this patent is extended or adjusted under 35 U.S.C. 154(b) by 650 days.

(21) Appl. No.: 12/350,621

(22) Filed: Jan. 8, 2009

(65) Prior Publication Data
US 2009/0219396 A1   Sep. 3, 2009

(30) Foreign Application Priority Data
Feb. 28, 2008  (JP) ................. 2008-047653

(51) Int. Cl.
*H04N 17/00*  (2006.01)
*H04N 17/02*  (2006.01)
(52) U.S. Cl. ........................................ 348/187
(58) Field of Classification Search .......... 348/187, 348/188, 180
See application file for complete search history.

(56) References Cited

U.S. PATENT DOCUMENTS

| | | | | |
|---|---|---|---|---|
| 6,768,509 B1* | 7/2004 | Bradski et al. | ........ | 348/207.99 |
| 7,697,839 B2* | 4/2010 | Cutler | ........ | 396/322 |
| 7,742,634 B2* | 6/2010 | Fujieda et al. | ........ | 382/154 |

OTHER PUBLICATIONS

Zhang, Zhengyou, "A Flexible New Technique for Camera Calibration," *Technical Report MSR-TR-98-71*, Microsoft Research, Microsoft Corporation, Dec. 1998.

Zhang, Zhengyou, "Camera Calibration With One-Dimensional Objects," *Technical Report MSR-TR-2001.120*, Microsoft Research, Microsoft Corporation, Aug. 2002.

Farin et al., "Robust Camera Calibration for Sport Videos using Court Models," *Proc. SPIE Storage and Retrieval Methods and Applications for Multimedia 2004*, vol. 5307, pp. 80-91, Jan. 2004.

David Lowe, "Distinctive Image Features from Scale-Invariant Keypoints," *International Journal of Computer Vision*, Computer Science Department, University of British Columbia, Jan. 2004.

Mikolajczyk et al., "A Comparison of Affine Region Detectors," *International Journal of Computer Vision*, Springer Science + Business Media, Jan. 2006.

Arya et al., "An Optimal Algorithm for Approximate Nearest Neighbor Searching in Fixed Dimensions," *Proc. The Fifth Annual ACM-SIAM Symposium on Discrete Algorithms*, pp. 573-582, 1994.

Fischler et al., "Random Sample Consensus: A Paradigm for Model Fitting with Applications to Image Analysis and Automated Cartography," *Communications of the ACM*, vol. 24, No. 6, Jun. 1981.

* cited by examiner

*Primary Examiner* — Michael Lee
(74) *Attorney, Agent, or Firm* — Oliff & Berridge, PLC

(57) ABSTRACT

The present invention relates to calibration of camera parameters for converting a world coordinate system, which indicates a position in the real space, to a coordinate used in an image and vice versa. The apparatus according to the invention has a detection unit, which determines corresponding pixel pairs from the captured image and the model image and outputs corresponding data indicating determined pixel pairs, and a selection unit, which selects pixel pairs to be left in the corresponding data and removes data related to an unselected pixel pair from the corresponding data for generating selected corresponding data. The apparatus further has a calculation unit, which calculates camera parameters based on the selected corresponding data.

13 Claims, 8 Drawing Sheets

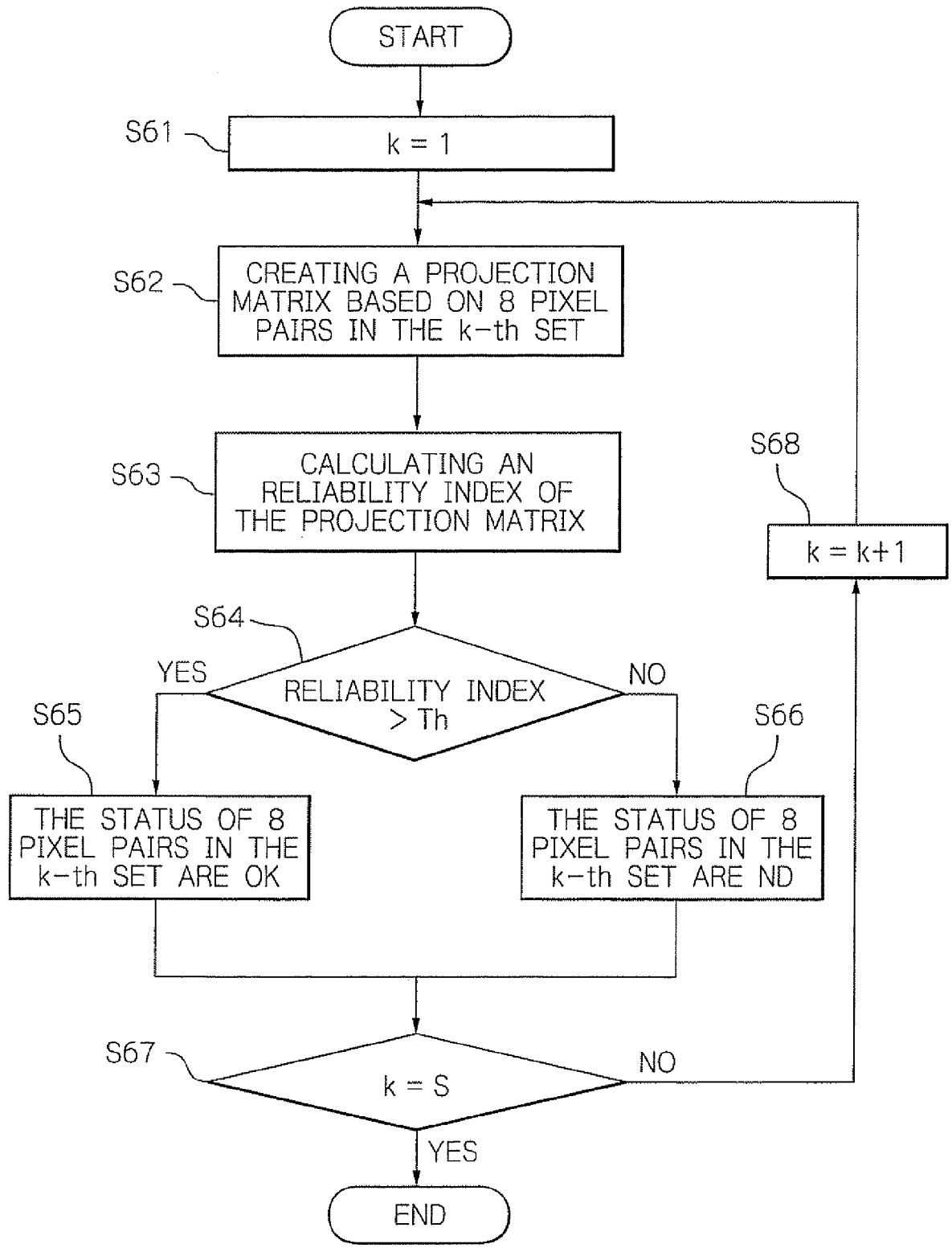

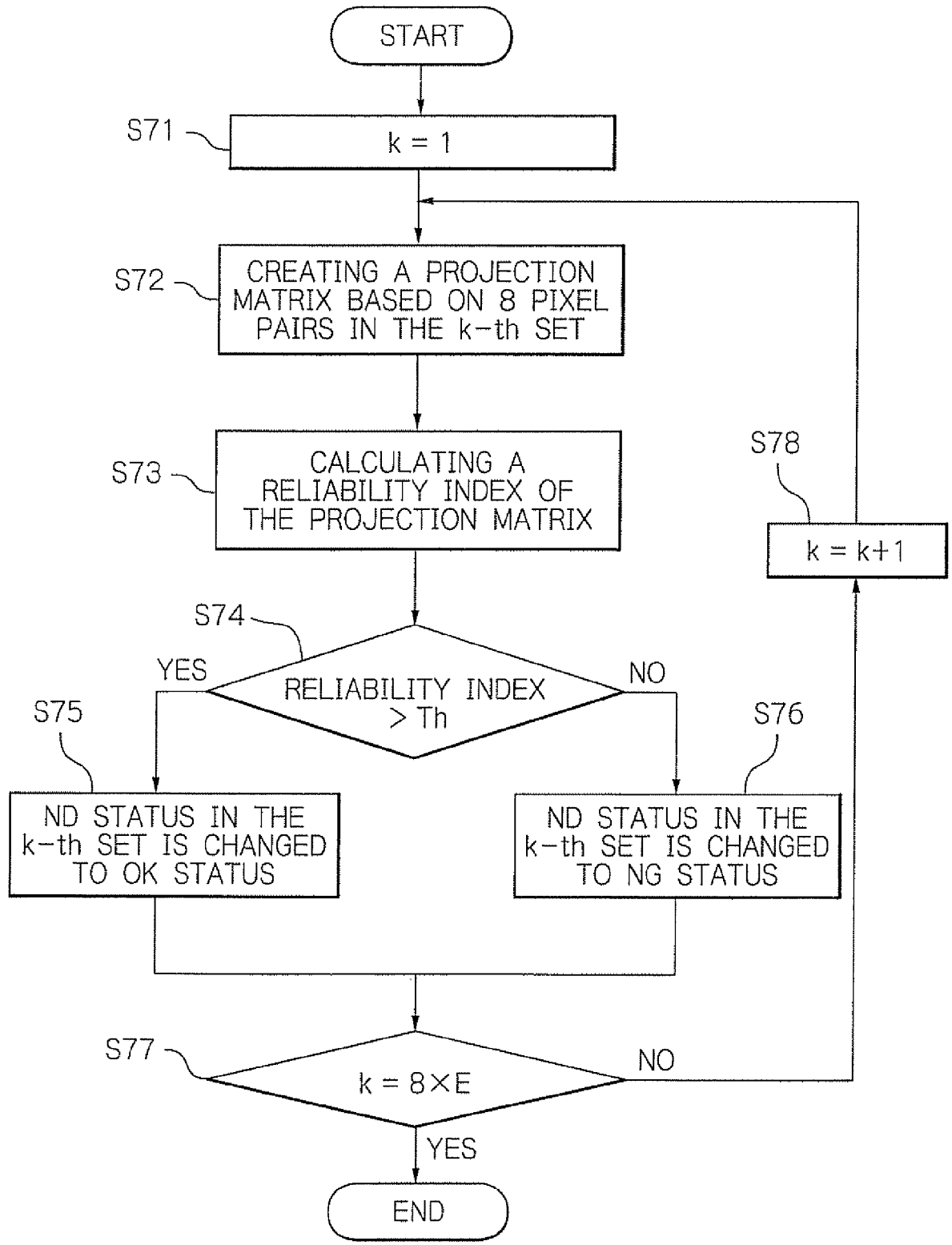

Fig. 9

| PAIR NUMBER | GROUP NUMBER | STATUS |
|---|---|---|
| 1 | 1 | ND |
| 2 | 1 | OK |
| 3 | 1 | ND |
| 4 | 1 | OK |
| 5 | 2 | ND |
| 6 | 2 | OK |
| 7 | 2 | ND |
| 8 | 2 | OK |
| ... | ... | |
| 29 | 8 | ND |
| 30 | 8 | OK |
| 31 | 8 | ND |
| 32 | 8 | OK |
| 33 | NA | |

Fig. 8

| PAIR NUMBER | GROUP NUMBER | STATUS |
|---|---|---|
| 1 | 1 | |
| 2 | 1 | |
| 3 | 1 | |
| 4 | 1 | |
| 5 | 2 | |
| 6 | 2 | |
| 7 | 2 | |
| 8 | 2 | |
| ... | ... | |
| 29 | 8 | |
| 30 | 8 | |
| 31 | 8 | |
| 32 | 8 | |
| 33 | NA | |

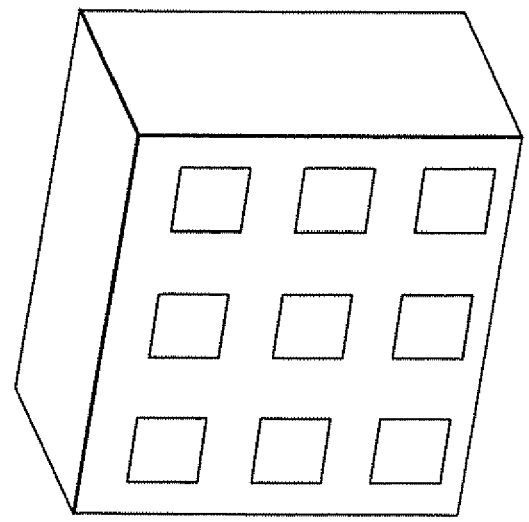
Fig. 11a
Fig. 11b
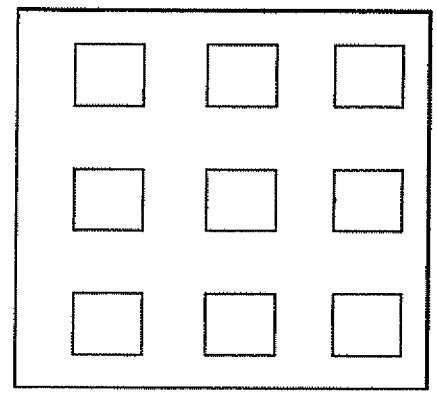
Fig. 10
| PAIR NUMBER | GROUP NUMBER | STATUS |
|---|---|---|
| 1 | 1 | OK |
| 2 | | OK |
| 3 | | NG |
| 4 | | OK |
| 5 | 2 | OK |
| 6 | | OK |
| 7 | | OK |
| 8 | | OK |
| ... | ... | |
| 29 | 8 | NG |
| 30 | | OK |
| 31 | | OK |
| 32 | | OK |
| 33 | NA | |

CALIBRATION APPARATUS AND METHOD FOR IMAGING DEVICES AND COMPUTER PROGRAM

PRIORITY CLAIM

This application claims priority from Japanese patent application No. 2008-047653 filed on Feb. 28, 2008, which is incorporated herein by reference.

BACKGROUND OF THE INVENTION

1. Field of the Invention

The present invention relates to calibration of camera parameters for converting a world coordinate system, which indicates a position in the real space, to a coordinate system used in an image and vice versa.

2. Description of the Related Art

For calculating camera parameters, various methods have been proposed, for example, in Zhengyou Zhang, "A Flexible New Technique for Camera Calibration", Technical Report MSR-TR-98-71(Document 1) and Zhengyou Zhang, "Camera Calibration With One-Dimensional Objects", Technical Report MSR-TR-2001-120(Document 2) and Dirk Farin, et al., "Robust Camera Calibration for Sport Videos using Court Models". Proc. SPIE Storage and Retrieval Methods and Applications for Multimedia 2004, Vol. 5307, pp. 80-91. (Document 3).

For calibration, the method disclosed in Document 1 utilizes a grid pattern in an object in an image, and the method disclosed in Document 2 utilizes a stick shaped object in an image. Therefore, these methods can be applied, only if there is such an object. The method disclosed in Document 3 utilizes cross points such as cross points of lines in the field of sports game, and the application is restricted. Further, there are some possibilities of false detection of a line out of the field as a line in the field.

In image processing field, a method using feature points, which are extracted based on pixel values, is well known to find out corresponding pixel pairs in two images. To extract feature points from an image, Scale Invariant Feature Transform (SHIFT) method and Affine Region Detection method are well known. The SHIFT method is disclosed in David G. Lowe, "Distinctive Image Features from Scale-Invariant Keypoints", Computer Science Department University of British Columbia, and Affine Region Detection method is disclosed in K. Mikolajczyk, et al., "A Comparison of Affine Region Detectors", International Journal of Computer Vision 2006. Further, cross points in document 3 can be used as feature points.

For searching corresponding pixel pairs among feature points, Approximate Nearest Neighbor method can be used in addition to SHIFT method. Approximate Nearest Neighbor method is disclosed in Sunil Arya, et al., "An optimal Algorithm for Approximate Nearest Neighbor Searching in Fixed Dimensions", Proc. the fifth annual ACM-SIAM Symposium on Discrete Algorithms, pp. 573-582.

Corresponding pixels, which are searched by using above methods, includes errors, and it is required to remove false pixel pairs. To remove false pixel pairs, Least Median of Square (LMedS) method and Random Sample Consensus (RANSAC) method are known. RANSAC method is disclosed in Martin A. Fischler, et al., "Random Sample Consensus: A Paradigm for Model Fitting with Applications to Image Analysis and Automated Cartography", Communications of the ACM, Vol. 24, Number 6. However these methods cannot remove misdetected pixel pairs completely.

SUMMARY OF THE INVENTION

It is an object of the present invention to provide an apparatus and method for obtaining camera parameters without using a special shape or pattern in the image.

According to the invention, an apparatus for obtaining camera parameters of an imaging device based on a captured image captured by the imaging device and a premade model image has a detection unit, a selection unit, and a calculation unit. The captured image has a plurality of pixels, which are referred as captured pixels, the model image has a plurality of pixels, which are referred as model pixels, and each model pixel is associated with a world coordinate.

The detection unit selects captured pixels from the captured image and model pixels from the model image, detects corresponding pixel pairs between selected captured pixels and selected model pixels, and generates corresponding data indicating detected pixel pairs. The selection unit selects pixel pairs to be left in the corresponding data, removes data related to one or more unselected pixel pairs from the corresponding data, and generates selected corresponding data. The calculation unit calculates camera parameters based on the selected corresponding data. Selected captured pixels and model pixels may be feature points extracted from each image.

According to the invention, a method for obtaining camera parameters of an imaging device based on a captured image captured by the imaging device and a premade model image are provided. In the method, captured pixels and mode pixels are selected from the captured image and model image, corresponding pixel pairs between selected captured pixels and selected model pixels are searched, and corresponding data indicating searched pixel pairs are generated. Then, data related to a false pixel pair is removed from the corresponding data for generating selected corresponding data, and camera parameters are calculated based on the selected corresponding data.

Preferably, a plurality of projection matrixes, which converts coordinates between a captured coordinated system used for the captured image and a model coordinate system used for the model image are generated based on pixel pairs included in the corresponding data, a reliability index of each projection matrix is determined by converting a coordinate of each pixel pair in the corresponding data, and each projection matrix is divided into a high reliability group and a low reliability group by comparing the reliability index with a threshold. Here, the false pixel pairs is selected among pixel pairs used to generate projection matrixes in the low reliability group, and pixel pairs used to generate projection matrixes in the high reliability group are left in the corresponding data.

Favorably, a first status is assigned to each pixel pair used to generate a projection matrix in the high reliability group, and a second status is assigned to each pixel pair used to generate a projection matrix in the low reliability group. Then new projection matrixes are generated using a plurality of pixel pairs having the first status and one pixel pair having the second status, a new reliability index is calculated for each new projection matrix, and divided into a new high reliability group and a new low reliability group by comparing the new reliability index with a threshold. Finally, data related to pixel pairs, which are used to generate new projection matrixes in the new low reliability group and have the second status, are removed from the corresponding data.

Favorably, removing pixel pairs are repeated with changing the threshold, which is used to divide projection matrixes.

Advantageously, to calculate reliability index, a coordinate of a model pixel or a captured pixel in each pixel pair is converted using a projection matrix, a difference between the converted coordinate and the coordinate of the corresponding model pixel or captured pixel are calculated for each pixel pair. The reliability index of the projection matrix is determined based on the number of pixel pair, of which the calculated difference is less than or equal to a predetermined value.

Preferably, a pair number is assigned to each pixel pair in the corresponding data, and pixel pairs used to generate a projection matrix are selected based on the pair number of each pixel pair. Further, before assigning pair number, it is possible to remove some pixel pairs by searching positional relations of a captured pixel and a model pixel in each pixel pair of the corresponding data.

According to the invention, a computer program functions a computer as the apparatus described above, and a computer readable medium includes the computer program.

Further objects and advantages of the present invention will be apparent from the following description of the preferred embodiments of the invention as illustrated in the accompanying drawings.

BRIEF DESCRIPTION OF THE DRAWINGS

FIG. 6 is a flowchart of the first determination process;

FIG. 7 is a flowchart of the second determination process;

FIG. 8 is an explanation drawing of grouping of pixel pairs;

FIG. 9 shows a result of the first determination process;

FIG. 10 shows a result of the second determination process;

FIG. 11a shows a captured image; and

FIG. 11b shows a model image.

DETAILED DESCRIPTION OF THE INVENTION

Figure 1:
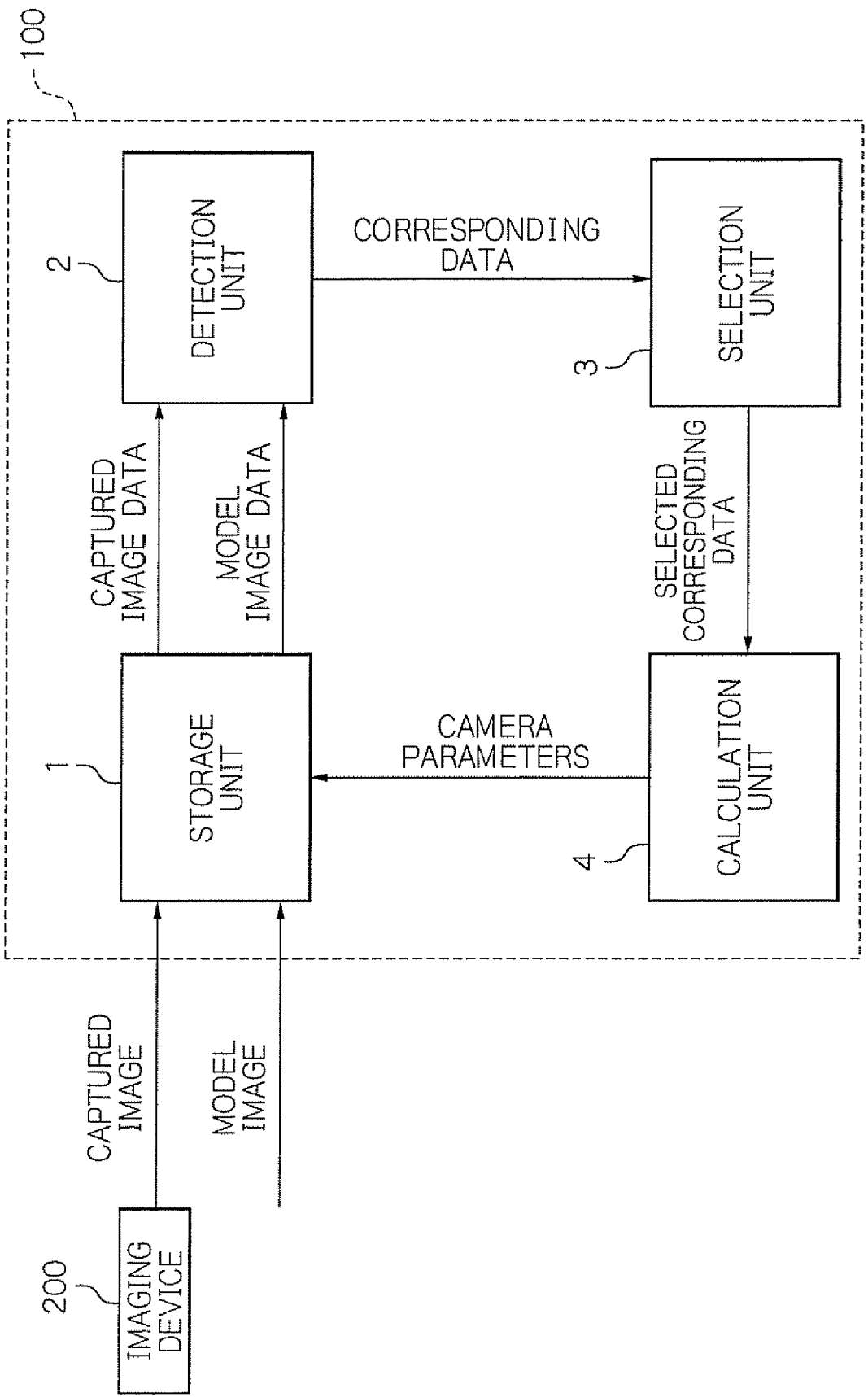
FIG. 1 is a block diagram of an apparatus according to the invention.

FIG. 1 is a block diagram of a calibration apparatus 100 according to the invention, and the apparatus 100 has a storage unit 1, a detection unit 2, a selection unit 3 and a calculation unit 4.

The storage unit 1 stores data of motion pictures or static pictures captured by an imaging device 200. Further, the storage unit 1 stores image data for calibration, which is created for example by using a computer graphic technique in advance. Objects in an image for calibration has the same as one in an image captured by the imaging device 200. Hereinafter, an image captured by the imaging device 200 is referred as a captured image, pixels in the captured image are referred as captured pixels, a coordinate system used for the captured image is referred as a captured coordinate system, and a coordinate of the captured coordinate system is referred as a captured coordinate. Similarly, a premade image for calibration is referred as a model image, pixels in the model image are referred as model pixels, a coordinate system used for the model image is referred as a model coordinate system, and a coordinate of the model coordinate system is referred as a model coordinate. Thus, the storage unit 1 has captured image data and model image data. Here, captured image data indicates a pixel value and a captured coordinate for each captured pixel, and model image data indicates a pixel value, a model coordinate and a world coordinate indicating a position of a real space for each model pixel.

It is noted directions of the model image and the captured image are not necessary the same. More specifically, it is possible to use the model image, which is an anterior view of a building as shown in FIG. 11b, even though the captured image is a perspective view of the building as shown in FIG. 11a.

The detection unit 2 reads out captured image data and model image data, and extracts captured pixels and model pixels to be feature points. For feature point extraction, SHIFT method and/or Affine Region Detection method can be used. However, it is possible to use other methods such as a method using cross points for the extraction. Further, the detection unit 2 searches an extracted model pixel, which corresponds to an extracted captured pixel, and outputs corresponding data, which indicates a model pixel and a captured pixel of a corresponding pixel pair. More specifically, corresponding data includes a pixel value and a captured coordinate value of a captured pixel; and a pixel value, a model coordinate value and a world coordinate value of a model pixel for each pixel pair. For searching corresponding feature points, it is possible to use SHIFT method and/or Approximate Nearest Neighbor method.

The selection unit 3 selects correct pixel pairs among pixel pairs searched at the detection unit 2, and outputs selected corresponding data to the calculation unit 4. In other words, the selection unit 3 determines pixel pairs, which are falsely detected, and eliminates data related to false pixel pairs from corresponding data, and output selected corresponding data. The calculation unit 4 calculates camera parameters based on a captured coordinate value of a captured pixel and a world coordinate value of a model pixel in each pixel pair included in the selected corresponding data, and stores calculated camera parameters into the storage unit 1. The calculation unit 4 uses a known method for calculating camera parameters.

Figure 2A:
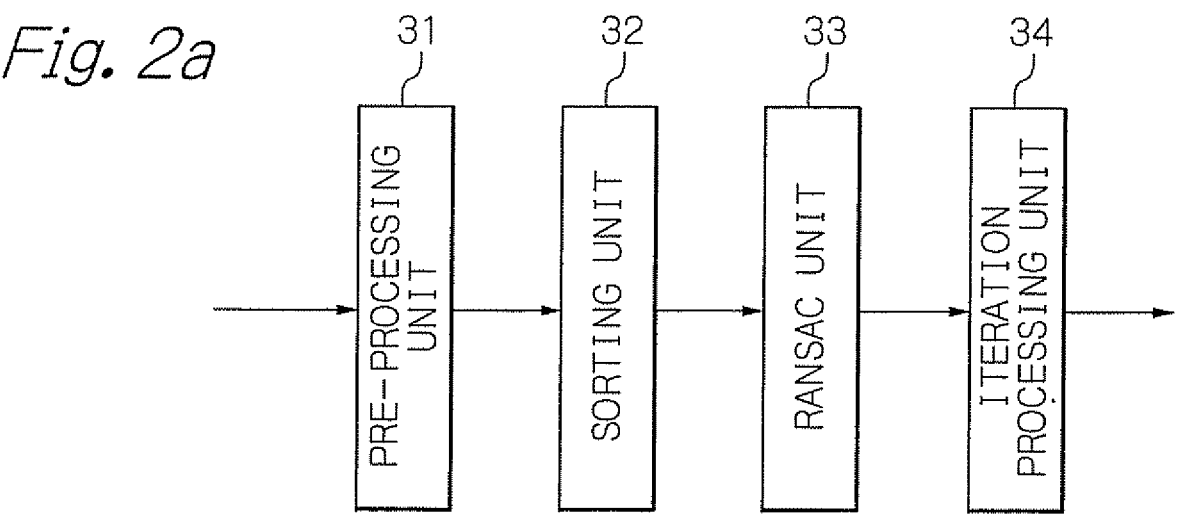
FIGS. 2a, 2b and 2c are block diagrams of a selection unit.
Figure 2B:
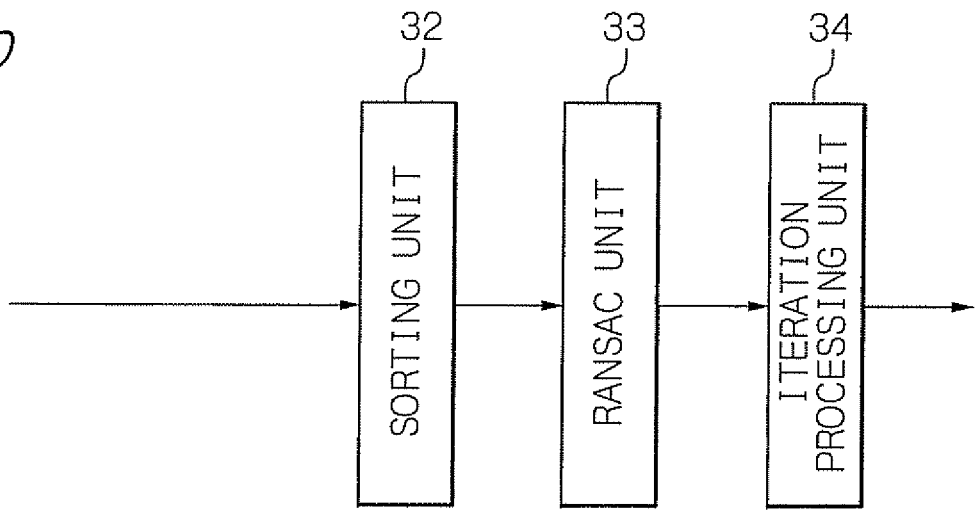
Figure 2C:
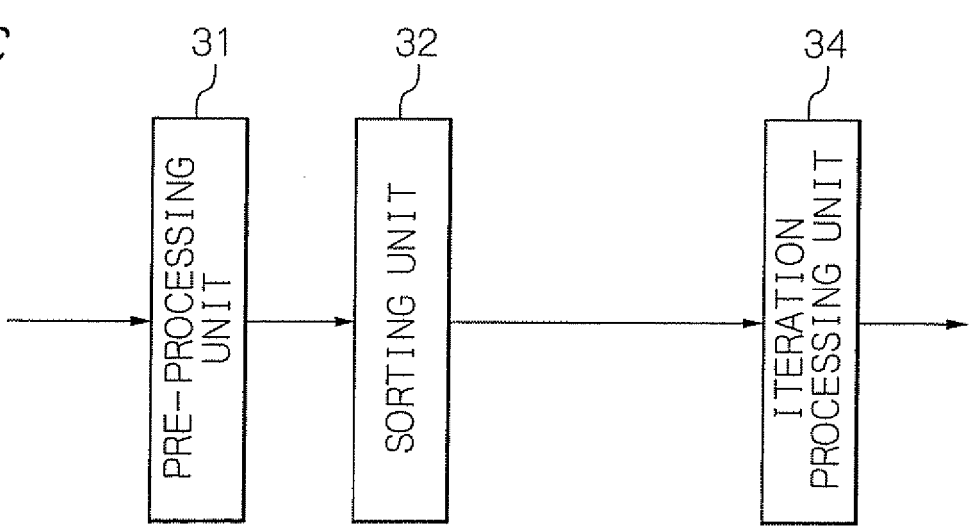

FIGS. 2a, 2b and 2c respectively show an embodiment of the selection unit 3. According to FIG. 2a, the selection unit 3 has a pre-processing unit 31, a sorting unit 32, a RANSAC unit 33 and an iteration processing unit 34. According to FIG. 2b, the selection unit 3 has the sorting unit 32, the RANSAC unit 33 and the iteration processing unit 34. According to FIG. 2c, the selection unit 3 has the pre-processing unit 31, the sorting unit 32 and the iteration processing unit 34.

Figure 3A:
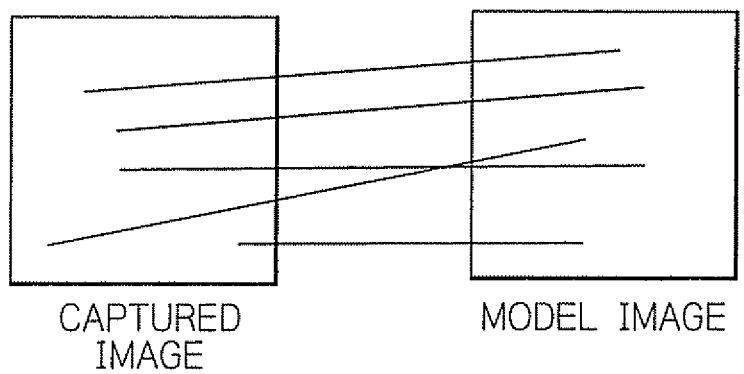
FIGS. 3a and 3b are explanation drawings of the process in a pre-processing unit.
Figure 3B:
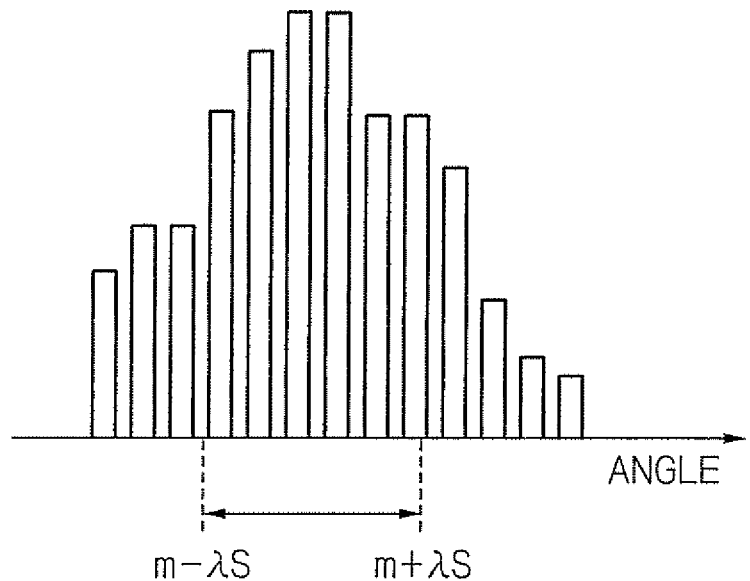

FIGS. 3a and 3b are explanation drawings of the process in the pre-processing unit 31. The pre-processing unit 31 determines an angle of each line, which connects corresponding pixels of each pixel pair as shown in FIG. 3a, with reference to the predetermined reference direction. Then, the pre-processing unit 31 counts a number of lines for each angle, and calculates an average "m" and a standard deviation "S" of angles. Finally, the pre-processing unit 31 selects pixel pairs, of which angles are within the range of m−λS and m+λS, outputs selected pixel pairs, and eliminates unselected pixel pairs from corresponding data. In other word, the pre-processing unit 31 creates a histogram as shown in FIG. 3b, outputs pixel pairs within the range indicated by the arrow, and removes other pixel pairs.

Figure 4:
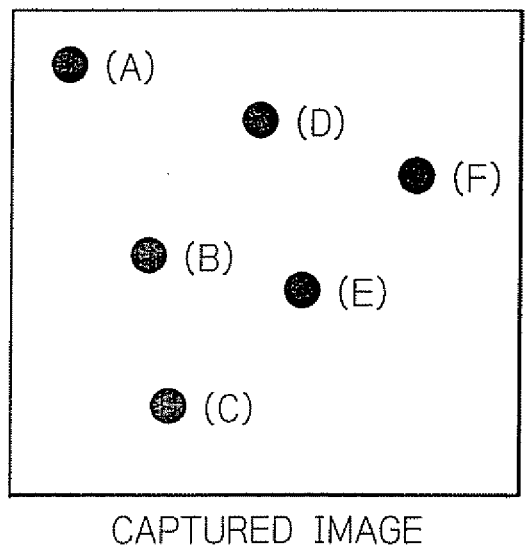
FIG. 4 is an explanation drawing of a process in a sorting unit.

FIG. 4 is an explanation drawing of the process in a sorting unit 32. In FIG. 4, six pixels A to F in the captured image are extracted as feature points, and have a corresponding pixel in the model image respectively. The sorting unit 32 decides the order or sequence of pixel pairs, and assign a pair number for each pixel pair in accordance with the decided order. In the embodiment, the sorting unit 32 decides the pair number such that captured pixels has close number if they are close in the captured image. For example, the sorting unit 32 assigns a pair number from the upper side pixel to lower side pixel in the captured image with snaking manner. In this example, the sorting unit 32 assigns pair number 1, 2, 3, 4, 5 and 6 to pixel pairs including pixels A, D, F, B, E and C respectively.

The RANSAC unit 33 detects one or more pixel pairs, which are falsely detected at the detection unit 2 based on RANSAC method, and removes data related to false pixel pairs from corresponding data. It is possible to replace the RANSAC unit 33 with another unit, which detects false pixel pairs, such as an LMeDS unit performing LMeDS method.

Figure 5:
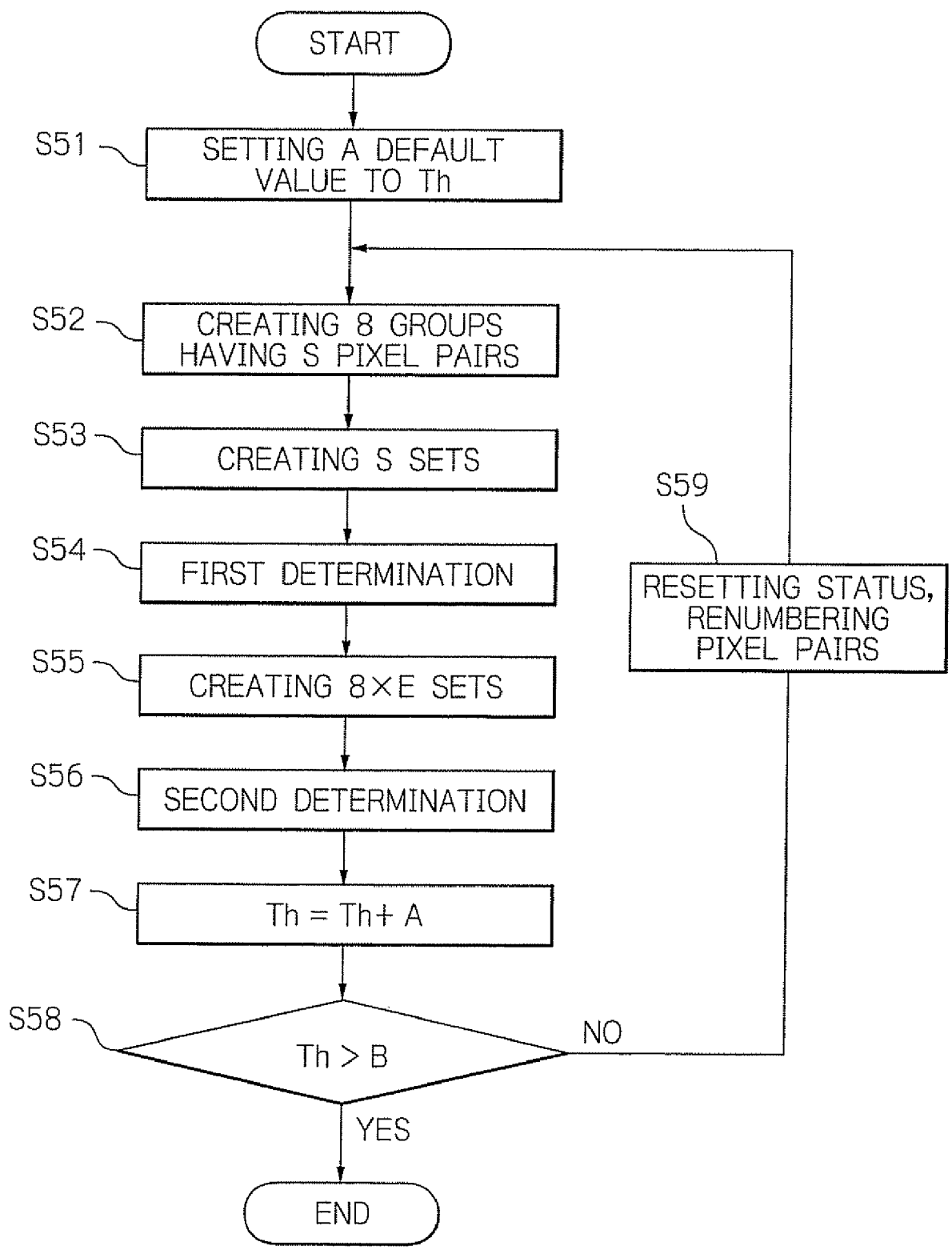
FIG. 5 is a flowchart of a process performed at an iteration processing unit.

FIG. 5 is a flowchart of a process performed in an iteration processing unit 34. The iteration processing unit 34 also detects one or more pixel pairs, which are falsely detected at the detection unit 2, removes data related to false pixel pairs from corresponding data, and outputs selected corresponding data. The iteration processing unit 34 sets a default value to a threshold Th in a step S51. In a step S52, the iteration processing unit 34 divides N pixel pairs into 8 groups, each of which has S pixel pairs, based on the pair number decided by the sorting unit 32. Here, N is a number of corresponding pixel pairs input to the iteration processing unit 34, and S is a integer, which satisfies 8*S<=N<=8*(S+1). At this moment, pixels pairs, which has pair numbers from 8*S+1 to N, don't belong to any group. FIG. 8 shows 8 groups in case of N=33. As shown in FIG. 8, pixels pairs having pair numbers 1 to 4 belong to group 1, pixels pairs having pair numbers 5 to 8 belong to group 2, and the pixel pair having pair number 33 does not belong to any group at this moment.

After grouping, the iteration processing unit 34 selects a pixel pair from each group, and creates S sets, each of which has 8 pixel pairs, in a step S53. For example, the iteration processing unit 34 divides the pair number of each pixel pair by S, and pixel pairs having the same reminder are set to the same set. Thus, pixel pairs having pair number 1, 5, . . . , 29 are belonged to the same set, pixel pairs having pair number 2, 6, . . . , 30 are belonged to the same set, pixel pairs having pair number 3, 7, . . . , 31 are belonged to the same set, and pixel pairs having pair number 4, 8, . . . , 32 are belonged to the same set.

In a step S54, the iteration processing unit 34 performs the first determination process for each set using Th. Each pixel pair included in sets, which are not satisfied with predetermined condition describing later, is classified as "ND" (Not Decided), and each pixel pair included in sets, which are satisfied with the condition, is classified as "OK". FIG. 9 shows a result of the first determination process. According to FIG. 9, two sets, which include pixel pairs having pair numbers 2 and 4, are satisfied with the condition, and two sets, which include pixel pairs having pair numbers 1 and 3, are not satisfied with the condition.

In a step S55, the iteration processing unit 34 selects a ND pixel pair from a certain group and an OK pixel pair from each group except for the certain group, and creates 8*E sets, each of which has 8 pixel pairs. Here, E is the number of sets, which are not satisfied with the condition in the step S54. For example, in case two sets are not satisfied with the condition as shown in FIG. 9, the iteration processing unit 34 creates 16 sets in the step S55. In case the result of the first determination process is as shown in FIG. 9, the iteration processing unit 34 selects, for example, one pixel pair having pair number 1, of which the status is ND, and 7 pixel pairs having OK status from group 2 to group 8 respectively to create one set.

In a step S56, the iteration processing unit 34 performs the second determination process for each set using Th. If a set is not satisfied with a predetermined condition, the pixel pair having ND status in the set is changed to "NG" status. On the contrary, if a set is satisfied with a predetermined condition, the pixel pair having ND status in the set is changed to "OK" status. Pixel pairs classified as OK in the first determination process are unchanged regardless the result of the second determination process. FIG. 10 shows a result of the second determination process. According to FIG. 10, two sets, which include pixel pairs having pair numbers 3 and 29, are not satisfied with the condition.

In a step S57, the threshold value Th is increased by A. In a step S58, Th is compared with the predetermined maximum value B. If Th is more than B, the iteration processing unit 34 outputs data related to pixel pairs having OK status as "selected corresponding data". If not, the iteration processing unit 34 resets the status of all pixel pair, and renumbers each pixel pair such that pair numbers become consecutive, in a step S59. For example, the iteration processing unit 34 changes pair number 4 to 28 to pair number 3 to 27, and pair number 30 to 33 to pair number 28 to 31, in case the result of the second determination process is as shown in FIG. 10. Then, the steps S52 to S58 are repeated until Th exceeds B. If no pixel pair is changed to NG status in the second determination process, it is possible to stop iteration process, event though Th is less than or equal to B.

FIG. 6 is a flowchart of the first determination process in the step S54 of FIG. 5. In a step S61, a variable k is set to 1. In a step S62, the iteration processing unit 34 generates a projection matrix, which converts a captured coordinate to a model coordinate, based on 8 pixel pairs in the k-th set. It is possible to use any known method for generating the projection matrix. Next, the reliability index is determined in a step S63. Here, the reliability index indicates the accuracy of the coordinate conversion of the projection matrix. To determine the reliability index, a captured coordinate of each captured pixel in all pixel pairs in the corresponding data are converted to a model coordinate using the projection matrix. Then, the distance between a converted model coordinate from a captured pixel and a model coordinate of a model pixel corresponding to the captured pixel are calculated as the distance of the pixel pair for each pixel pair. Then, the number of pixel pairs, of which the distance is smaller than or equal to a predetermined value, for example 3 pixels, is counted, and ratio of the counted number to the number of all pixel pairs is calculated as the reliability index.

More specifically, assuming there are M pixel pairs, a captured coordinate of a captured pixel in the i-th pixel pair is $C_i$, a model coordinate of a model pixel in the i-th pixel pair is $M_i$, and a model coordinate converted from $C_i$ using the projection matrix is $MC_i$, a distance of the i-th pixel pair is a distance between coordinates $M_i$ and $MC_i$. If the number of pixel pairs, of which the distance is smaller than or equal to the predetermined value, is SM, the reliability index is SM/M.

In a step S64, the reliability index is compared to the threshold value Th. If the reliability index is more than Th, then pixel pairs in the k-th set, which are used for generating the projection matrix, are changed to OK status in a step S65. If not, then pixel pairs in the k-th set are changed to ND status in a step S66.

For example, in case the number of pixel pairs is 100, and the number of pixel pair, of which the distance is smaller than or equal to the predetermined value, is 60, then the reliability index of the projection matrix is 0.6. If Th is 0.8, then statuses of 8 pixel pairs used to generate the projection matrix are ND. Above steps are repeated for each sets (S67 and S68).

FIG. 7 is a flowchart of the second determination process. Steps S71 to S74 are the same as the steps S61 to S64, and the reliability index of the projection matrix, which is generated pixel pairs in the k-th set, is calculated and compared to Th. If the reliability index is more than Th, one pixel pair having ND status in the k-th set is changed to OK status in a step S75. If not, one pixel pair having ND status in the k-th set is changed to NG status in a step S76. Above steps are repeated for each sets (S77 and S78).

In the first determination process, projection matrixes are generated using 8 pixel pairs in a set respectively, and divided into a high reliability group or a low reliability group using Th. If a projection matrix is created using correct pixel pairs, converted model coordinates are similar to coordinates of corresponding model pixels. Thus, the reliability index becomes high, and pixel pairs used to generate projection matrixes in the high reliability group are classified as "OK" indicating a correct pixel pair. On the contrary, if at least one false pixel pair is included in a set, the projection matrix created by the set converts a lot of captured coordinates to wrong model coordinates. Thus the reliability index becomes low. However, there is no information about what and how many pixel pairs in the set are falsely detected. Therefore, all pixel pairs used to generate projection matrixes in the low reliability group are marked as "ND" indicating "Not Decided" in the first determination process.

The second determination process is basically the same as the first one. However, each set includes only one pixel pair marked as ND, and statuses of remaining pixel pairs in the set are OK. Therefore, if the reliability index of the projection matrix generated from a certain set is low, it can be decided the pixel pair having ND status in the certain set is error, and NG status is assigned for the pixel pair. On the contrary, if the reliability index is high, it can be decided the pixel pair having ND status is not error. According to the invention, pixel pairs having NG status are removed, and the first and the second determination process are repeated with increasing Th. With this configuration, the invention can remove false pixel pairs accurately. Here, the purpose of the sorting unit 32 is to reduce space correlation of pixel pairs included in one set.

The apparatus and method according to the invention obtains camera parameters using a model image, which is generated for example using a computer graphic technique, and does not require a specific shape or pattern in an image. To generate accurate camera parameters using the model image, it is important to eliminate pixel pairs, which are falsely detected at the detection unit 2. However, false pixel pairs are still output using the prior art, such as RANSAC method and LMedS method.

The invention can remove false pixel pairs effectively by the iteration processing unit 34. It is preferable to provide the pre-processing unit 31 on the upstream of the iteration processing unit 34 to narrow the corresponding data. The pre-processing unit 31 checks the relation of pixel position of each pixel pairs, and removes the pixel pairs, of which relation is too different from others. Thus, the pre-processing unit 31 can narrow the number of pixel pairs with easy and simple processing. Further, it is possible to use the known method, such as RANSAC and LMedS, in addition to the iteration processing unit 34.

In the above embodiment, captured coordinates are converted to model coordinates for calculating a reliability index. However, it is possible to convert model coordinates to captured coordinates for calculating a reliability index.

Many modifications and variations will be apparent those of ordinary skilled in the art. The embodiments was chosen and described in order to best explain the principles of the invention. It should be understood that the present invention is not limited to the specific embodiments described in the specification, except as defined in the appended claims.

For example, the invention may be achieved by a program product, which realizes the functions of the above embodiments. Programs defining functions on the invention can be delivered to a computer system using computer readable storage media or via network. It should be understood the invention may be implemented by software, hardware or a combination of software and hardware.

The invention claimed is:

1. An apparatus for obtaining camera parameters of an imaging device based on a captured image captured by the imaging device and a premade model image, the captured image having a plurality of captured pixels, the model image having a plurality of model pixels, and each model pixel being associated with a world coordinate, the apparatus comprising:
   detection means for selecting captured pixels from the captured image and model pixels from the model image, detecting corresponding pixel pairs between selected captured pixels and selected model pixels, and generating corresponding data indicating detected pixel pairs;
   selection means for selecting pixel pairs to be left in the corresponding data, removing data related to an unselected pixel pair from the corresponding data, and generating selected corresponding data; and
   calculation means for calculating camera parameters based on the selected corresponding data.

2. The apparatus according to claim 1, wherein the selection means generates a plurality of projection matrixes, which converts coordinates between a captured coordinated system used for the captured image and a model coordinate system used for the model image, based on pixel pairs included in the corresponding data;
   determines a reliability index of each projection matrix by converting a coordinate of each pixel pair in the corresponding data; and
   divides each projection matrix into a high reliability group and a low reliability group by comparing the reliability index with a threshold,
   wherein the selection means leaves pixel pairs, which are used to generate projection matrixes in the high reliability group, in the corresponding data.

3. The apparatus according to claim 2, wherein the selection means assigns a first status to pixel pairs used to generate a projection matrix in the high reliability group;
   assigns a second status to pixel pairs used to generate a projection matrix in the low reliability group;
   generates a plurality of new projection matrixes using a plurality of pixel pairs having the first status and one pixel pair having the second status;
   determines a new reliability index of each new projection matrix by converting the coordinate of each pixel pair in the corresponding data; and
   divides each new projection matrix to a new high reliability group and a new low reliability group by comparing the new reliability index with the threshold,
   wherein the selection means removes a pixel pair, which is used to generate a new projection matrix in the new low reliability group and has the second status.

4. The apparatus according to claim 3, wherein the selection means repeats removing pixel pairs with changing the threshold.

5. The apparatus according to claim 2, wherein the selection means converts a coordinate of a model pixel or a captured pixel in each pixel pair using a projection matrix;

calculates a difference between the converted coordinate and the coordinate of the corresponding model pixel or the captured pixel for each pixel pair; and determines the reliability index of the projection matrix based on a number of each pixel pair, of which the calculated difference is less than a predetermined value.

6. The apparatus according to claim 2, wherein the selection means includes numbering means for assigning a pair number for each pixel pair in the corresponding data, and pixel pairs used to generate a projection matrix are selected based on the pair number of each pixel pair.

7. The apparatus according to claim 6, wherein the selection means further includes pre-processing means provided upstream of the numbering means, wherein the pre-processing means searches positional relations of a captured pixel and a model pixel in each pixel pair of the corresponding data, and removes pixel pairs based on the positional relations.

8. The apparatus according to claim 1, the selected captured pixels and the selected model pixels at the detection means are feature points of the captured or model image.

9. A method for obtaining camera parameters of an imaging device based on a captured image captured by the imaging device and a premade model image, the captured image having a plurality of captured pixels, the model image having a plurality of model pixels, and each model pixel being associated with a world coordinate, the method comprising the steps of:

selecting captured pixels from the captured image and model pixels from the model image;

searching corresponding pixel pairs between selected captured pixels and selected model pixels;

generating corresponding data indicating searched pixel pairs;

removing data related to a false pixel pair from the corresponding data for generating selected corresponding data; and calculating camera parameters based on the selected corresponding data.

10. The method according to claim 9, wherein the removing step comprises the steps of:

generating a plurality of projection matrix converting coordinates between a captured coordinated system used for the captured image and a model coordinate system used for the model image based on pixel pairs included in the corresponding data;

determining a reliability index of each projection matrix by converting a coordinate of each pixel pair in the corresponding data; and dividing each projection matrix into a high reliability group and a low reliability group by comparing the reliability index with a threshold, wherein the false pixel pair is selected from pixel pairs used to generate projection matrixes in the low reliability group.

11. The method according to claim 10, wherein the removing step further comprises the steps of:

assigning a first status to pixel pairs used to generate a projection matrix in the high reliability group and a second status to pixel pairs used to generate a projection matrix in the low reliability group;

generating a plurality of new projection matrixes using a plurality of pixel pairs having the first status and one pixel pair having the second status;

determining a new reliability index of each new projection matrix by converting the coordinate of each pixel pair in the corresponding data; and dividing each new projection matrix to a new high reliability group and a new low reliability group by comparing the new reliability index with the threshold, wherein the false pixel pair is the one having the second status and used to generate a new projection matrix in the low reliability group.

12. The method according to claim 11, wherein the removing step is repeated with changing the threshold.

13. A non-transitory computer readable medium storing a computer program causing a computer to function as the apparatus according to claim 1.

* * * * *